United States Patent [19]

Halling et al.

[11] 4,071,268
[45] Jan. 31, 1978

[54] PRESSURE COMPENSATED SLIDE JOINT

[75] Inventors: Horace P. Halling, Laurel; Bernard J. Sadoff, Jr., Rockville, both of Md.

[73] Assignee: Pressure Science Incorporated, Beltsville, Md.

[21] Appl. No.: 691,157

[22] Filed: May 28, 1976

[51] Int. Cl.$^2$ .................. F16L 17/00; F16L 27/04
[52] U.S. Cl. .................. 285/95; 285/106; 285/165; 285/263; 285/334.4; 285/DIG. 1; 285/DIG. 18
[58] Field of Search ............ 285/95, 165, DIG. 1, 285/106, 110, 263, 334.4, DIG. 18

[56] References Cited

U.S. PATENT DOCUMENTS

| | | | |
|---|---|---|---|
| 2,405,152 | 8/1946 | Kilchenmann | 285/DIG. 18 |
| 2,712,456 | 7/1955 | McCreery | 285/165 |
| 2,774,618 | 12/1956 | Alderson | 285/261 X |
| 2,781,205 | 2/1957 | Lane et al. | 285/106 |
| 3,508,769 | 4/1970 | Wucherpfennig | 285/165 |

FOREIGN PATENT DOCUMENTS 520,715  5/1940  United Kingdom ................. 285/263

*Primary Examiner*—Thomas F. Callaghan
*Attorney, Agent, or Firm*—Roylance, Abrams, Berdo & Kaul

[57] ABSTRACT

A pressure compensated slide joint for sealing first and second tubes having high pressure fluid flowing therethrough comprising a metallic, resilient sealing element extending from the first tube into an interference fit with the interior surface of the second tube, and an annular chamber, variable lengthwise in the axial direction, formed from two parts, each coupled to one of the tubes and in a slidable, sealing relationship with the other, and which has a vent communicating with the interior of the second tube. The sealing element is formed of a frustoconical portion and a ring portion having a curved outer surface contacting the interior surface of the second tube.

10 Claims, 6 Drawing Figures

PRESSURE COMPENSATED SLIDE JOINT

The present invention relates to a pressure compensated slide joint for sealing first and second tubes having high pressure fluid flowing therethrough, and more particularly relates to such a joint in which a metallic, resilient sealing element extends from the first tube into an interference fit with the interior surface of the second tube to seal these tubes together. The basic design of the sealing member is disclosed in our concurrently filed patent application entitled TUBE AND CYLINDRICAL SURFACE SEALING APPARATUS Ser. No. 691,160, with the present application disclosing various specific uses of the sealing member disclosed therein. In addition, other applications of the sealing member are disclosed in our concurrently filed patent application entitled FLEXIBLE PIPING JOINT Ser. No. 691,159.

Many piping, or ducting, systems utilized in aircraft have high pressure fluid flowing therethrough from a body rigidly fixed to the aircraft's structure to a second body which utilizes the fluid under pressure. Because of the pressure of the fluid in the piping system, the second body experiences forces tending to separate it from the first body. Sometimes the second body is also rigidly secured to the aircraft's structure forming a "compression piping system" between the first and second bodies. However, the various supports utilized to secure the second body against these separating forces add undesirable weight and bulk to the system. Accordingly, it is advantageous to allow the pressure forces tending to separate the first body from the second body to be carried by the pipe itself forming a "tension system" thereby saving the structural weight required to secure the second body against these separating forces. In both types of systems, the piping must traverse curved paths, is exposed to thermal expansion, and mechanical forces which require flexible joints to permit movement of the tubes in the system. Conventional slide joints are suitable for axial movement in compression systems but are not suitable in tension systems since the separating pressure forces are not contained by the joint. Thus, a simple slide joint will assume its extreme position on first application of pressure.

Bellows-sealed gimbal, hook and spherical joints are utilized in tension piping systems to provide the necessary flexibility; however, axial motion can only be attained by using three angulating bellows-sealed joints which are bulky and heavy, and are therefore not advantageous. Bellows joints also increase the effective area of the piping cross-section on which the pressure acts, thereby increasing the load to be transmitted by these joints. In addition, various types of pressure balanced, or compensated, slide joints have been utilized in the prior art which counteract the pressure tending to pull two joined tubes apart. However, these are deficient since the sealing mechanism around the slide joint is prone to fatigue and wear resulting in high leakage rates, and these joints are heavy and of large diameter because each such joint contains at least two concentric bellows.

It is therefore an object of the present invention to provide a pressure compensated slide joint for a piping system with a viable sealing member which does not appreciably add to the piping's effective area and permits relative rotation between tubes in the system.

Another object of the present invention is to provide a pressure compensated slide joint which is light, compact and can be utilized in environments of extreme temperature.

Another object is to provide a pressure compensated slide joint which is easy to manufacture and install.

Another object is to provide a pressure compensated slide joint which provides for lateral offset misalignment of two tubes in a piping system.

Another object is to provide a pressure compensated slide joint which provides for angular misalignment between two tubes utilized in a piping system.

The foregoing objects are attained by providing a pressure compensated slide joint for sealing first and second tubes having high pressure fluid flowing therethrough wherein the combination comprises a metallic, resilient sealing element extending from the first tube into an interference fit with the interior surface of the second tube forming a fluid tight seal therebetween; means defining an annular chamber which is variable lengthwise in the axial direction, this means comprising an annular outer wall coupled to the first tube and having an inner diameter larger than the outer diameter of the second tube, a first end wall depending from the outer wall, an annular inner wall formed by the outer surface of the second tube, and a second end wall extending from the outer surface of the second tube; first fluid-tight sealing means for sealing the first end wall and the inner wall during relative sliding movement thereof; second fluid-tight sealing means for sealing the second wall and the outer wall during relative sliding movement thereof, the end walls having equal surface areas, each of which is equal to the cross-sectional area of the tubes; and vent means in the second tube for venting the high pressure fluid therein into the chamber, the vent means being located between the end walls.

The sealing element, as well as the first and second sealing means, are formed from metallic material, such as high strength alloys, and each include a resilient frustoconical portion and a resilient ring portion, with the ring portion having a curved surface along which the seal line is made. This curved surface provides for an excellent seal, with low leakage rates, and, being made of metal, can be utilized in environments of extreme temperature as contrasted to elastomeric types of seals.

By utilizing these sealing mechanisms and by placing the pressure compensated chamber adjacent the main tube sealing element, a very lightweight and compact slide joint is provided.

As used herein, the phrase "interference fit" means that with the sealing member or element curved surface having a slightly different free diameter prior to installation from the diameter of the cylindrical surface and with the curved surface being resilient, on forcing the curved surface into or around the cylindrical surface the sealing member or element will be elastically deformed and thus maintained in intimate circumferential contact with the cylindrical surface due to the reactive force of the elastic deformation.

As used herein, the phrase "free diameter" means the diameter of the ring portion curved surface prior to installation with the cylindrical surface, and therefore prior to its elastic deformation, either compression or expansion.

Other objects, advantages and salient features of the present invention will become apparent from the following detailed description, which, taken in conjunction with the annexed drawings, discloses preferred embodiments of the present invention.

DRAWINGS

Referring now to the drawings which form a part of this original disclosure:

Figure 5:
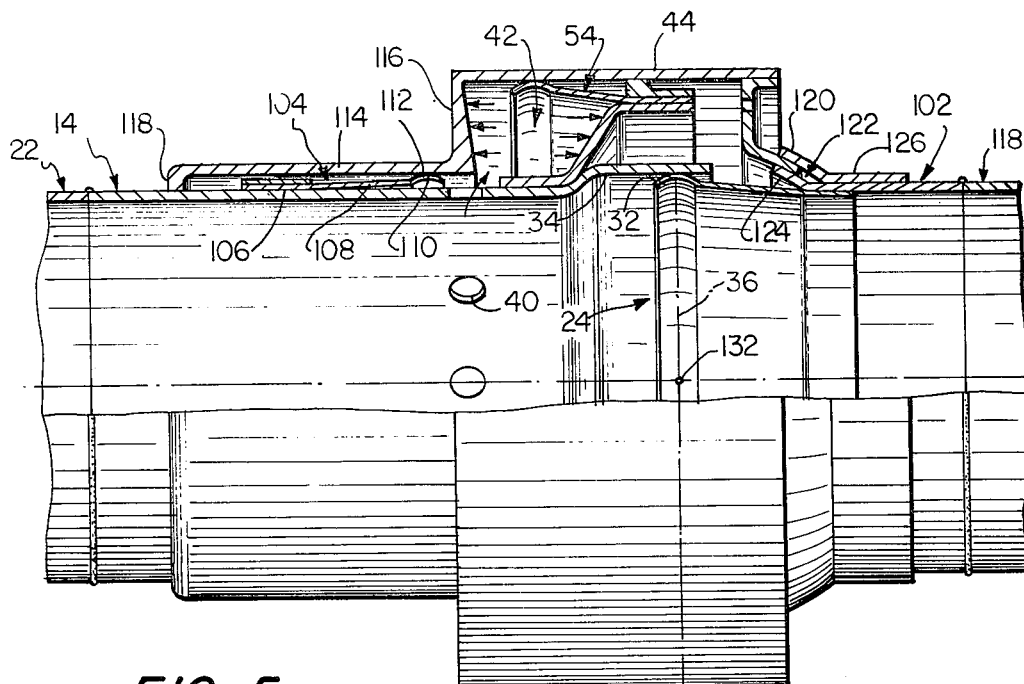
Figure 6:
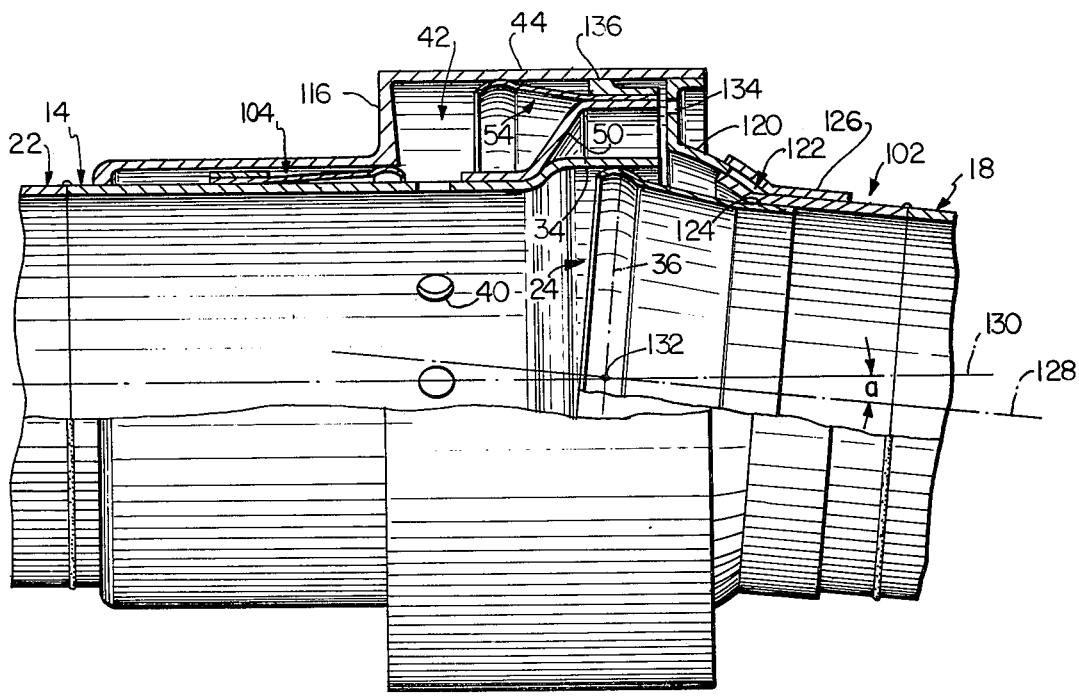

FIG. 5 is a side elevational view in partial longitudinal section of a third embodiment of the present invention in which angular misalignment of the first tube relative to the second tube is available, in addition to axial displacement therebetween; and FIG. 6 is a side elevational view in partial longitudinal section of the apparatus shown in FIG. 5 in which the first tube has been angularly misaligned relative to the second tube, and in addition, axial displacement therebetween has also been accomplished.

DETAILED DESCRIPTION OF THE INVENTION

Figure 1:
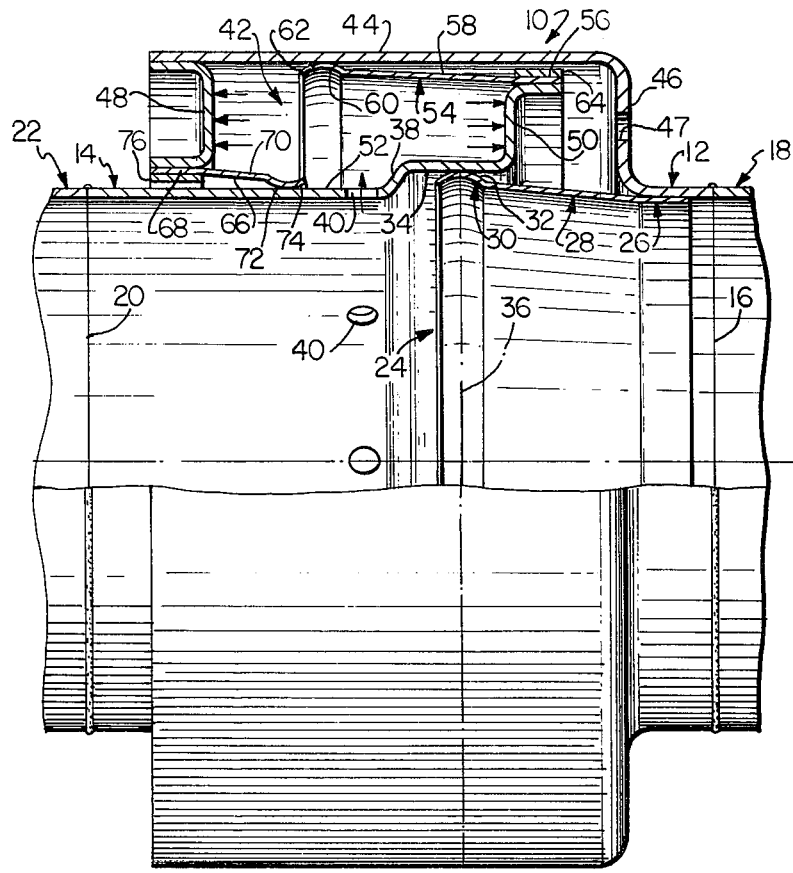
FIG. 1 is a side elevational view in partial longitudinal section of a first and second tube having the pressure compensated slide joint in accordance with the present invention thereon.

Referring to the drawings in further detail, as shown in FIG. 1, the pressure compensated slide joint 10 joins a first tube 12 and a second tube 14 wherein the first tube 12 is welded along weld line 16 to a first conduit 18 forming a piping system and the second tube 14 is welded along weld line 20 to a second conduit 22 forming the continuation of a piping system having a high pressure fluid flowing therethrough.

A main sealing element 24 is comprised of a cylindrical portion 26 welded to the interior cylindrical surface of tube 12, a frustoconical portion 28 having its smaller end extending from the cylindrical portion, and a ring portion 30 extending from the larger end of the frustoconical portion. The ring portion has an outer curved surface 32 in contact with the interior cylindrical surface of tube 14. This contact provides the sealing of the first and second tubes.

The sealing element 24 is formed from a high strength alloy such as Inconel 718 or Waspalloy, which has excellent spring properties at extreme temperatures. The longitudinal cross-sectional thickness of the sealing element is substantially the same along the cylindrical, frustoconical, and ring portions and can be from 0.003 to 0.020 inch in the range of tube diameters from 0.125 to 15.00 inches.

The fit of the sealing member 24 with the interior surface 34 of second tube 14 is an interference fit, as defined above, insofar as the maximum free diameter of the outer curved surface 32 is greater than the inner diameter of the interior surface 34 and the sealing member has been forced into the interior surface 34, remaining there by means of the outwardly directed spring force of the resilient ring and frustoconical portions. The seal interface 36 of the curved surface 32 and the interior surface 34 extends circumferentially around the curved surface where it continuously contacts the interior surface.

The interference fit must be relatively light to keep friction forces low to permit relative sliding and rotation of the sealing element 24 and surface 34 and to insure that the resilient sealing element is not stressed beyond its elastic limit. Although the interference fit is relatively light (0.002 to 0.005 inch for diameters below 1.25 inches, 0.003 to 0.007 inch for diameters below 3.0 inches, and greater as the diameters are increased), good sealing characteristics are present since pressure of the fluid in the tubes tends to force sealing element 24 outwardly into its sealing contact, thereby making the seal "pressure energized".

The radius of curvature of the curved surface 32 is shown in FIG. 1 as less than the radius of the interior surface 34 which increases the contact stress between surface 34 and surface 32, thereby decreasing the leakage rate of the contained fluid. It has been found that the radius of curvature can be reduced to about 20% of the radius of the surface 34 and still maintain a "bubble tight" seal with Nitrogen at 500 psi for small angular misalignment of the sealing element and the second tube. A "bubble tight" seal is one which has a leakage rate of $10^{-3}$ cc/sec. of Helium.

In addition to very slight angular misalignment, the curved surface 32 is capable of slidable movement along the interior surface 34 of the second tube 14 since the interference fit therebetween is a light one. However, since the sealing element 24 is formed of resilient material a viable seal is maintained during this sliding movement. This sliding movement would be limited, as the first tube 12 moves to the left as shown in FIG. 1, by contact of the ring portion 30 with the short frustoconical section 38 in the second tube 14 and as the first tube 12 moves to the right as shown in FIG. 1, by contact of ring portion 72 with short frustoconical section 38.

In order to provide the slide joint with a pressure balance, venting orifices 40 are spaced around the second tube 14 passing completely through the wall of the tube so that the fluid under pressure passing through the two tubes can exit from the tubes into the annular chamber 42 surrounding the connection of the two tubes.

This annular chamber 42 is defined by an annular outer wall 44 extending from tube 12 via ring 46, a first end wall 48 depending inwardly from the outer wall 44, a second end wall 50 extending outwardly from the second tube 14 at the end of the tube, and an inner wall 52 formed from the exterior surface of the second tube 14. Venting orifice 47 is formed in ring 46.

The surface areas of the end walls 48 and 50 are equal to each other, each of which is equal to the cross-section area of tubes 12 and 14 where sealing element 24 contacts surface 34 so the pressure contained in the tubes, and which tends to force them apart, is balanced by means of fluid flowing through the orifices 40 and into contact with opposite walls 48 and 50. Thus, as seen in FIG. 1, pressure, shown by the small arrows pushing against walls 48 and 50, causes equalization of forces so that the force of the pressure of the fluid flowing through the tubes on their projected areas does not tend to pull these tubes apart, the forces on wall 50 tending to move tube 14 to the right in FIG. 1 being equal to the forces on wall 48 tending to move tube 12 to the left.

In order to seal the annular chamber 42 a sealing member 54 is coupled to the exterior of end wall 50 and forms an interference fit with the interior surface of annular outer wall 44. This sealing member 54 is similar to the sealing element 24 and comprises a cylindrical portion 56, a frustoconical portion 58 and a ring portion 60. The sealing member 54 is formed of the same materials as sealing element 24 and has its ring portion curved surface 62 in an interference fit with the interior of the annular outer wall 44 in a similar manner to that described regarding sealing element 24 and interior surface 34. The maximum free diameter of the outer curved surface 62 is greater than the interior diameter of the outer wall 44, thereby providing such an interference fit. The cylindrical portion 56 of sealing member 54 is welded to the exterior portion of end wall 50 and has a ring 64 surrounding the cylindrical portion 56, the ring 64 usually being spaced from the interior surface of outer wall 44.

The first end wall 48 is similarly sealed to the exterior surface of tube 14 by means of a sealing member 66 similar to sealing member 54 and sealing element 24 and comprising a cylindrical portion 68 a frustoconical portion 70 and a ring portion 72 having a curved inner surface 74. The materials forming sealing member 66 are the same as sealing element 24 and the minimum free diameter of the curved surface 74 is, in this case, less than the outer diameter of the exterior surface of tube 14 which provides the interference fit between the sealing member 66 and tube 14. Ring 76 is coupled to the cylindrical portion 68 of the sealing member 66, which is in turn rigidly coupled to the bottom of first end wall 48. The inner surface of ring 76 is usually spaced from the exterior surface of tube 14.

Figure 2:
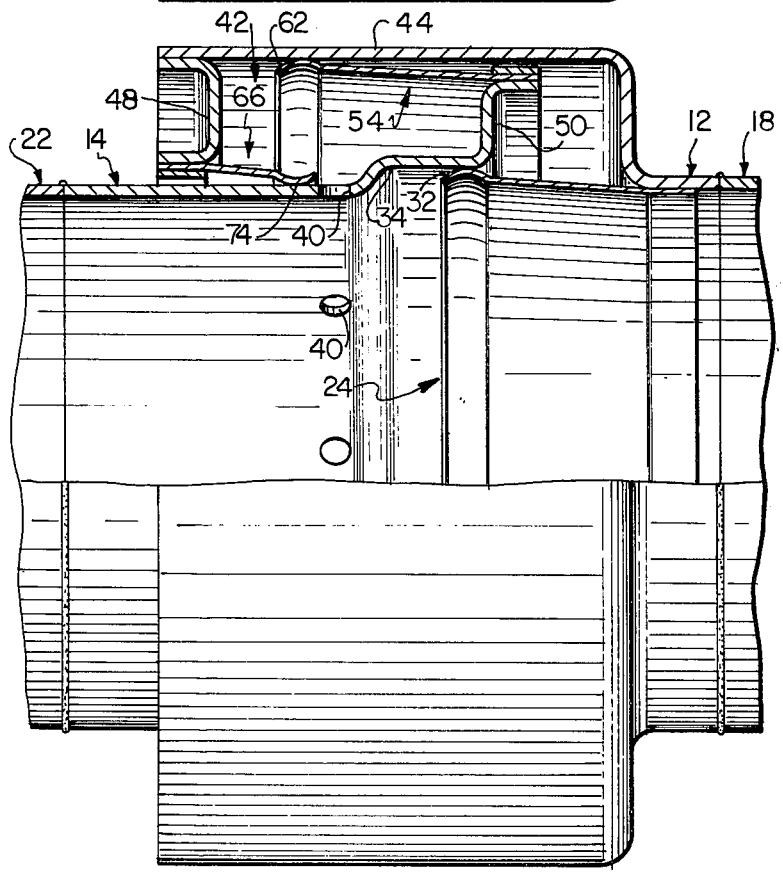
FIG. 2 is a side elevational view in partial longitudinal section of the apparatus shown in FIG. 1 after the first and second tubes have experienced axial displacement.

Referring now to FIG. 2, the apparatus shown in FIG. 1 is shown in which the first and second tubes have been axially displaced, such as by thermal expansion or mechanical forces experienced by the piping system formed by conduits 18 and 22. However, although the conduits have experienced such axial displacement, the three seals utilized in the apparatus maintain their sealing contact. Thus, sealing element 24 has been moved toward the end of the second tube 14, but still maintains its sealing contact with the interior surface 34 of that second tube.

In addition, the curved outer surface 62 on sealing member 54 has moved relative to the interior surface of the outer wall 44, but still maintains its sealing contact therewith. Finally, the inner curved surface 74 of the sealing member 66 on the first end wall 48 has moved along the exterior surface of the second tube 14, but still maintains its sealing engagement therewith.

EMBODIMENT OF FIGS. 3 AND 4

Figure 3:
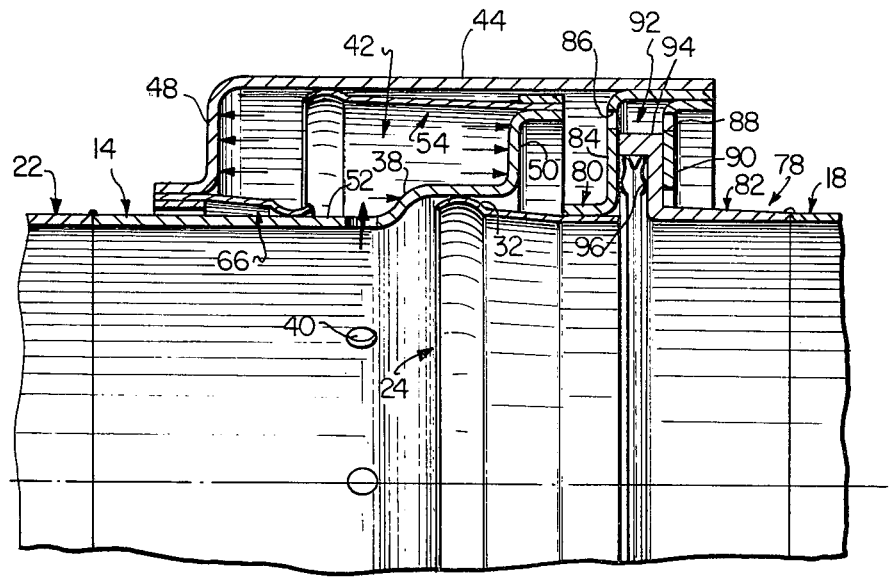
FIG. 3 is a side elevational view in partial longitudinal section of a second embodiment in accordance with the present invention in which lateral offset misalignment of two portions of the first tube is available in addition to axial displacement of the first and second tubes.
Figure 4:
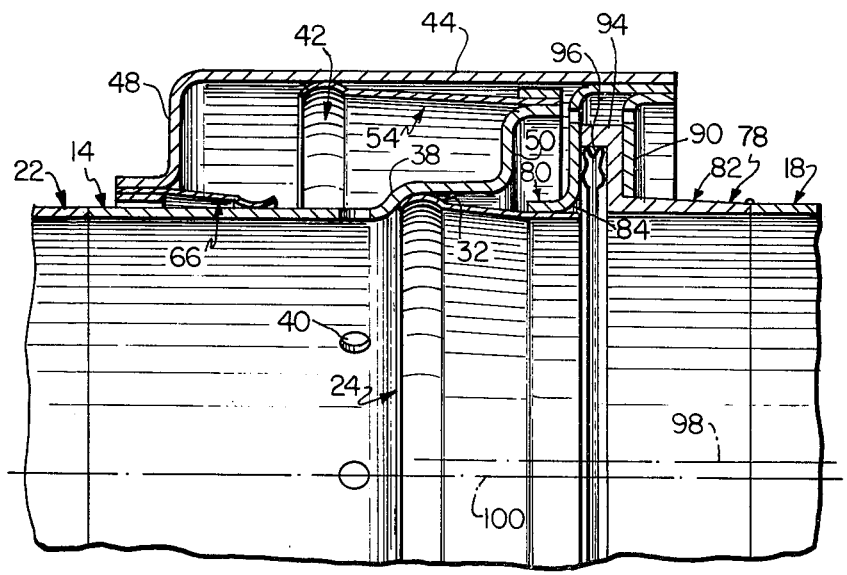
FIG. 4 is a side elevational view in partial longitudinal section of the apparatus shown in FIG. 3 except the second portion of the first tube has been laterally offset relative to the first portion of that tube and the first and second tubes have been axially displaced.

The embodiment of the present invention shown in FIGS. 3 and 4 allows for axial displacement of two tubes and additionally allows for offset misalignment of two portions forming the first tube.

The apparatus shown in FIG. 3 is substantially the same as that shown in FIG. 1, and similar elements will be given similar character numerals, however, various parts are added to the first tube now designated 78.

Thus, tube 78 comprises a first portion 80 and a second portion 82, with the sealing member 24 being rigidly coupled to the interior surface of the first portion 80. A first ring 84 extends upwardly from the first portion 80 where it is rigidly coupled to the outer wall 44. The first ring 84 has a vent orifice 86 therein which is aligned with a vent orifice 88 formed in the second ring 90 which extends downwardly from the outer wall 44. The first and second rings are spaced apart and define an annular cavity 92 therebetween for the reception of an L-shaped annular flange 94 extending from the end of the second portion 82 of the first tube 78. The second ring 90 has an inner diameter larger than the outer diameter of the second portion 82 and the annular flange 94 has an outer diameter larger than the inner diameter of the second ring. The longitudinal width of the L-shaped annular flange 94 is substantially equal to the distance between opposing sides of rings 84 and 90, so that relative movement therebetween in the radial direction is possible.

A seal 96 having an E-shaped cross-section is interposed between the annular flange 94 and the first ring 84 so as to seal these portions from fluid leakage. This seal 96 can expand in the axial direction of the first and second portions and is of the type disclosed in U.S. Pat. No. 3,797,836, issued on Mar. 19, 1974 to Horace P. Halling, the disclosure of which is hereby incorporated by reference.

The remaining portions of the apparatus disclosed in FIG. 3 are substantially similar to those disclosed above regarding FIG. 1 and, therefore, will not be discussed in detail, except to point out that the operation regarding axial displacement of the first portion 80 and the second tube 14 is the same as that described above regarding FIG. 1.

Referring now to FIG. 4, axial displacement of the first tube 78 relative to the second tube 14 has taken place with sealing member 24 having moved into contact with the short frustoconical section 38 on the second tube 14. In addition, the second portion 82 of the first tube 78 has been axially offset relative to the first portion 80 with the center line 98 of second portion 82 now being above center line 100 of first portion 80. This offset misalignment is limited by contact of the interior surface of the second ring 90 with the exterior surface of the second portion 82. In any event, seal 96 still maintains its sealing against the first ring 84.

EMBODIMENT OF FIGS. 5 AND 6

The embodiment of FIGS. 5 and 6 is similar to that described above regarding FIGS. 1 and 2; however, the sealing of the pressure compensated chamber 42 is slightly different and a guiding mechanism is provided to guide angular misalignment of the first tube 102 relative to the second tube 14.

Thus, referring now to FIG. 5, sealing element 24, as well as sealing member 54 are substantially the same, while the sealing member 104 is different. This sealing member 104 comprises a cylindrical portion 106 rigidly sealed to the exterior surface of second tube 14, a frustoconical portion 108 extending from the cylindrical portion, and a ring portion 110 extending from the larger end of the frustoconical portion. The ring portion 110 has a curved outer surface 112 which is in an interference fit with the interior surface of a cylindrical portion 114 which surrounds tube 14 and has an interior diameter larger than the exterior diameter of the tube. The maximum free diameter of the curved outer surface 112 is greater than the interior diameter of the cylindrical portion to provide the sealing contact between these members, as described above regarding sealing element 24 and FIG. 1.

The cylindrical portion 114 extends concentrically from the bottom of first end wall 116 forming the annular chamber 42 and has an end portion 118 in slidable engagement with the exterior surface of tube 14.

When the first tube 102 and the second tube 14 shown in FIGS. 5 are axially displaced, the apparatus reacts as that described above regarding FIG. 1 except the curved outer surface 112 slides across in a sealing contact the interior surface of the cylindrical portion 114.

Depending downwardly from the outer wall 44 on the annular chamber 42 is an arcuate follower 120 which has a spherical inner and outer surface, the center of such sphere being located at the center point of the line contact of the curved outer surface 32 and the interior surface 34 of the second tube 14. This line, or seal interface 36, has its center point along the center lines of tubes 102 and 14.

An arcuate cavity 122 through which the arcuate follower 120 moves, is formed by an annular flange 124 extending from the end of tube 102 and an annular ring member 126 mounted on the outside of the tube 102. The opposing surfaces of the annular flange 124 and the annular ring member 126 are spherical, with cavity 122 having a thickness substantially equal to the thickness of follower 120. The center of the spherical surfaces of the flange and the ring member coincides with the center of the spherical surfaces of the follower 120, i.e., the center of the circumferential contact line, or sealing interface 36, of the curved surface 32 and the interior surface 34.

Thus, as shown in FIG. 6, when the first tube 102 and the second tube 14 are angularly misaligned so that their center lines 128 and 130 are at an angle *a*, the follower 120 moves along the arcuate cavity 122, thereby maintaining the intersection point 132 of the center lines in the plane containing the seal interface 36 and also at the center point of this elliptical seal interface. By so doing, the follower and arcuate cavity, or guiding member, protects the sealing element 24 from mechanical shocks, guides the misalignment of the two tubes, and restrains such angular misalignment by limiting such to the travel of the arcuate follower through the arcuate cavity.

During such angular misalignment, the curved outer surface 32 of the sealing member 24 moves along the interior surface 34 of the second tube 14, but still maintains its viable sealing contact therewith.

As shown in FIG. 6, a venting orifice 134 is located in the follower 120 to provide a vent during relative movement of walls 116 and 50. In addition, a bearing ring 136 is interposed between the interior surface of the outer wall 44 and the exterior portion of the end wall 50.

While various embodiments have been chosen to illustrate the invention, it will be understood by those skilled in the art that various changes and modifications can be made therein without departing from the scope of the invention as defined in the appended claims.

What is claimed is:

1. A pressure compensated slide joint for sealing first and second tubes having high pressure fluid flowing therethrough, the combination comprising;
    a metallic, resilient sealing element having a free diameter greater than the interior diameter of the second tube and extending from the first tube into an interference fit with the interior surface of the second tube sufficient to cause elastic deformation of the sealing element and thereby forming a fluid-tight seal therebetween;
    means defining an annular chamber which is variable lengthwise in the axial direction, said means comprising
        an annular outer wall coupled to the first tube and having an inner diameter larger than the outer diameter of the second tube,
        a first end wall extending inwardly from said outer wall to a position adjacent the second tube,
        an annular inner wall formed by the outer surface of the second tube, and
        a second end wall extending outwardly from the outer surface of the second tube to a position adjacent said outer wall;
    first fluid-tight sealing means for sealing said first end wall and said inner wall during relative sliding movement thereof;
    second fluid-tight sealing means for sealing said second end wall and said outer wall during relative sliding movement thereof;
    said end walls having equal surface areas, each of which is equal to the cross-sectional area of the tubes, and
    vent means in said second tube for venting the high pressure fluid therein into said chamber, said vent means being located between said end walls,
    said first sealing means comprising a first metallic, resilient sealing member,
    said second sealing means comprising a second metallic, resilient sealing member, coupled to said second end wall adjacent said outer wall and having a curved surface with a maximum free diameter greater than the interior diameter of said outer wall, said curved surface being in an interference fit with the interior surface of said outer wall sufficient to cause elastic deformation of said second sealing member.

2. An apparatus according to claim 1, wherein
said first sealing member is coupled to said first end wall adjacent said inner wall and has a curved surface with a minimum free diameter smaller than the exterior diameter of said inner wall, said curved surface being in an interference fit with the exterior surface of said inner wall sufficient to cause elastic deformation of said sealing member.

3. A slide joint according to claim 1, wherein
said second sealing member further comprises a frustoconical portion having its smaller end extending from said second end wall and its larger end extending into a ring portion, said curved surface being the outer surface of said ring portion.

4. A slide joint according to claim 2, wherein
said first sealing member further comprises a frustoconical portion having its larger end extending from said first end wall and its smaller end extending into a ring portion, said curved surface being the inner surface of said ring portion.

5. A slide joint according to claim 1, wherein
the first tube has a first portion having said sealing element extending therefrom, a second portion separate from the first portion, and means for coupling said first and second portions to allow offset misalignment of the center lines of said portions.

6. A slide joint according to claim 5, wherein
said means for coupling comprises
    first and second rings spaced apart and coupled to said outer wall and said first portion and defining an annular cavity therebetween, and an L-shaped annular flange extending from said second portion into said annular cavity,
said second ring having an inner diameter larger than the outer diameter of said second portion,
said annular flange having an outer diameter larger than the inner diameter of said second ring.
7. A slide joint according to claim 6, wherein
a seal having an E-shaped cross-section is interposed between said annular flange and said first ring.
8. A slide joint according to claim 1 wherein
said first end wall has a cylindrical portion extending from the bottom thereof concentrically of the second tube and spaced therefrom, said cylindrical portion having an end portion in slidable engagement with the exterior surface of the second tube,
said first sealing member is coupled to the second tube and has a curved surface in an interference fit with the interior surface of said cylindrical portion sufficient to cause elastic deformation of said first sealing member, said curved surface having a maximum free diameter greater than the interior diameter of said cylindrical portion.
9. A slide joint according to claim 8, wherein
said first sealing member further comprises a frusto-conical portion having its smaller end extending from the second tube and its larger end extending into a ring portion, said curved surface being the outer curved surface of said ring portion.
10. A slide joint according to claim 1, wherein
said outer wall has an arcuate follower extending therefrom, and
the first tube has a guiding member defining an arcuate cavity through which said arcuate follower moves thereby restraining angular misalignment of the first and second tubes.

* * * * *